May 2, 1950 W. R. TRIPLETT 2,506,003
ELECTRICAL INSTRUMENT CONSTRUCTION
Filed Jan. 9, 1948 2 Sheets-Sheet 1
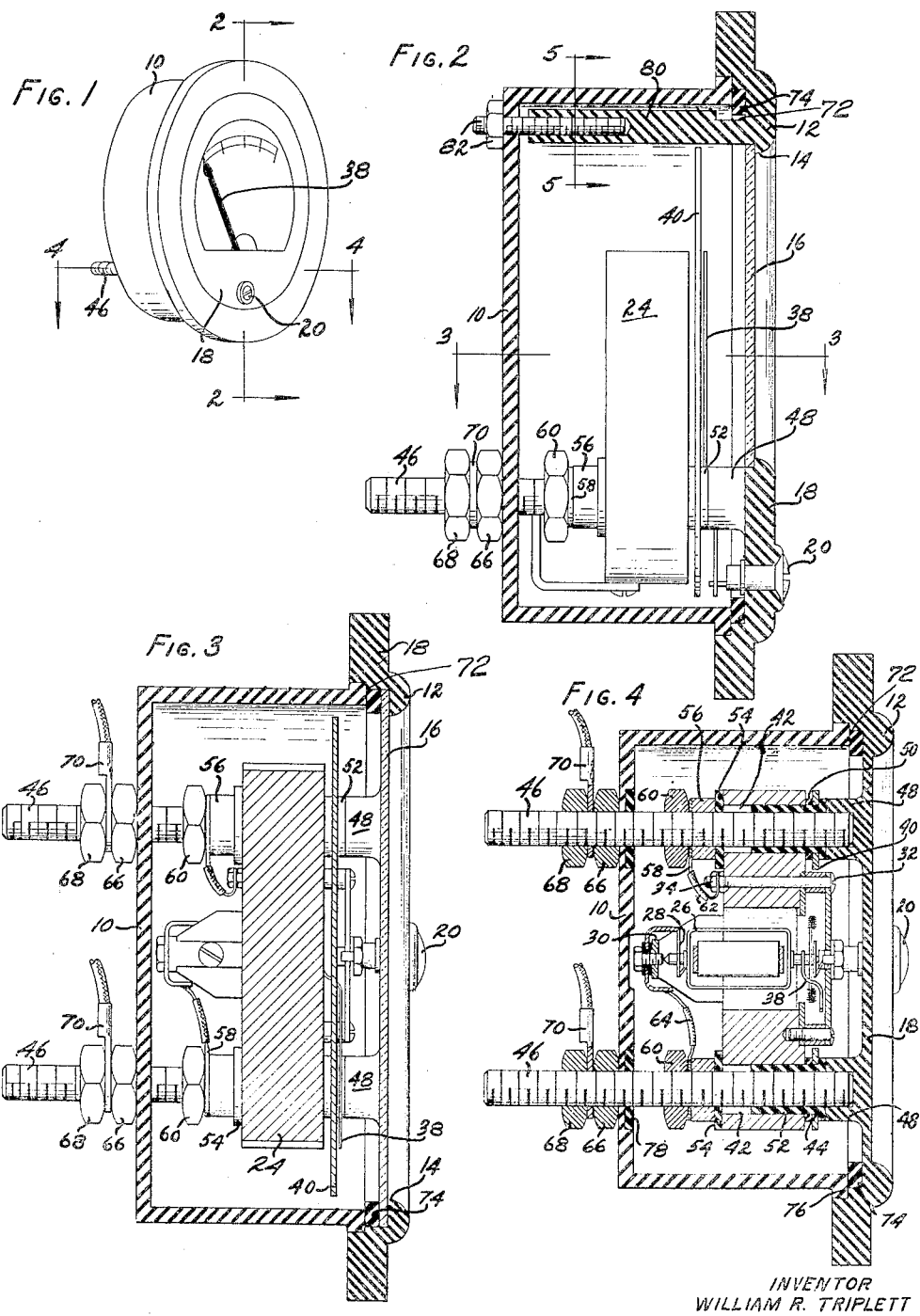
INVENTOR
WILLIAM R. TRIPLETT
BY
Toulmin & Toulmin
ATTORNEYS May 2, 1950 W. R. TRIPLETT 2,506,003
ELECTRICAL INSTRUMENT CONSTRUCTION
Filed Jan. 9, 1948 2 Sheets-Sheet 2
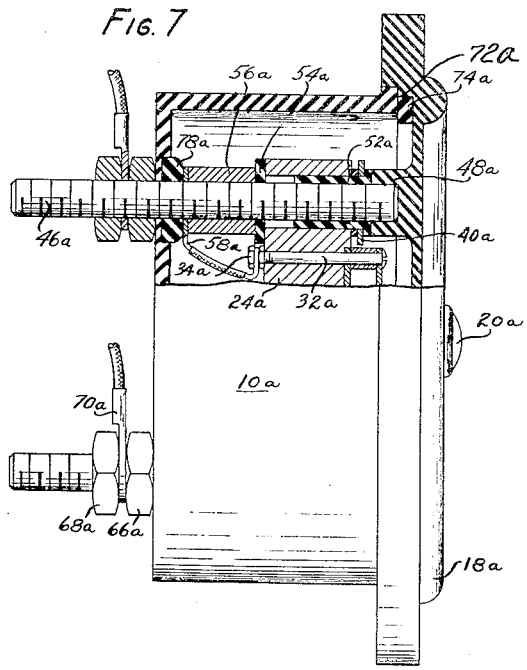
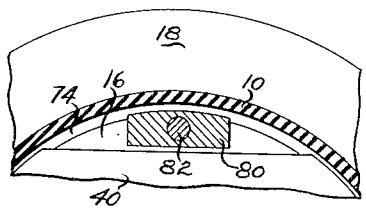
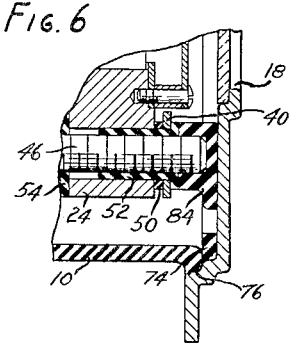
INVENTOR
WILLIAM R. TRIPLETT
BY
Toulmin + Toulmin
ATTORNEYS Patented May 2, 1950

2,506,003

UNITED STATES PATENT OFFICE 2,506,003

ELECTRICAL INSTRUMENT CONSTRUCTION

William R. Triplett, Bluffton, Ohio, assignor to The Triplett Electrical Instrument Co., Bluffton, Ohio, a corporation of Ohio Application January 9, 1948, Serial No. 1,378

9 Claims. (Cl. 171—95)

This invention relates to electrical indicating instruments and in particular to an improved construction therefor which leads to reduced cost and simplified assembly.

In the usual type of electrical indicating instruments there is a casing assembly comprising a cup shaped element having a window on one side thereof and having a closure member for closing the open end which is attached to the barrel of the case by screws which usually pass through the said barrel and thread into metallic inserts spaced around the periphery of the base part. The movement of such an instrument is attached to the closure member and there are usually separate studs secured to the base member and through which electric current is conducted to the instrument movement. The glass is usually held in place by a separate bezel ring or by a flanged metal member which is impressed into the case from the open side.

An instrument assembly as set forth above is relatively expensive and requires considerable labor to assemble the several parts into a finished instrument.

The primary object of the present invention is to provide an instrument construction which is more economical both as to material and as to time required for effecting the assembly of the instrument.

A still further object is the provision of an electrical instrument wherein the interior thereof is sealed at the time of assembling the instrument.

A still further object is to provide an instrument wherein a single means is provided for securing the several parts of the instrument case together and for assembling the instrument movement therein.

These and other objects and advantages of the present invention will become more apparent upon references to the following description taken in connection with the drawings wherein:

Figure 1 is a perspective view of a typical electrical indicating instrument of the type with which this invention is connected;

Figure 2 is a vertical section of the instrument shown in Figure 1 and is indicated by the line 2—2 on Figure 1;

Figure 3 is a plan section through the instrument as indicated by the line 3—3 on Figure 2;

Figure 4 is a plan section indicated by the line 4—4 on Figure 1 and shows the arrangement of the studs which retains the instrument in its assembled condition;

Figure 5 is a fragmentary section indicated by the line 5—5 on Figure 2;

Figure 6 is a fragmentary view showing the adaptation of this invention to a metallic instrument case; and Figure 7 is a fragmentary view showing still another form which this invention may take.

Referring to the drawings, the instrument shown therein comprises a cup shaped case member 10 which is closed at the bottom and open toward the front of the instrument and which mounts on its open side a flanged member 12 which includes a window aperture 14 within which is mounted a cover glass 16. The lower portion of the member 12 may include a shroud part as at 18 which supports the zero adjuster 20 and which conceals from view the moving parts of the instrument movement. The members 10 and 12 are made from any suitable electrical insulating material.

The instrument movement comprises a magnetic frame 24 within which is mounted a moving coil as shown at 26 in Figure 4. The coil 26 is mounted on suitable stud shafts at its opposite ends which turn in jeweled pivot screws and biasing springs as at 28 to provide for applying a restoring torque to the said coil when it is deflected by changes of energization thereof.

In the usual manner the springs 28 also serve as lead-ins for conducting current to the instrument coil and to this end the one thereof indicated at 30 on Figure 4 is insulated from the adjacent bridge of the frame work which supports the moving coil.

The aforementioned frame work for supporting the moving coil is an integral unit in itself and is assembled with the magnetic frame in the customary manner as by the screw means 32 which pass through the said magnetic frame and carry the clamping nuts 34.

The moving coil of the movement has secured thereto a pointer 38 which extends over the face of a dial 40 which is mounted between the instrument movement and the glass 16. This dial may be calibrated in any suitable manner according to the particular electrical quantity being measured.

According to this invention an improved mounting means for the instrument movement is provided by boring the magnetic frame as at 42 and by providing the aforementioned dial with apertures as at 44. Extending through the said bores and apertures are the studs 46 which extend out the back of the instrument case at one end and, at their other ends, are threaded into the bosses 48 which project inwardly from the shroud part 18 of the flanged cover member 12.

Suitable insulating means such as the washer 50 between the dial 40 and the magnetic frame 24, and the flanged insulating sleeve 52 extending around the studs where they pass through the dial and magnetic frame to provide for the electrical isolation of the studs, frame and dial.

At the rear side of the magnetic frame there are provided the washers 54 which encircle the studs 46 and between the said washers 54 and the bottom wall of the case there are the metallic washers 56, the electrical terminal clips 58, and the clamping nuts 60.

The electrical terminal clips 58 are for the purpose of making electrical connection with the opposite ends of the coil in the instrument movement and accordingly one thereof is connected as by the wire 62 with the supporting frame of the movement and the other thereof is connected by a wire 64 with the adjuster 30 which is insulated from the suspended supporting frame. In this manner the separate ends of the coil are separately connected with the studs 46. Due to the aforementioned insulating washers and sleeves the studs at the same time serve as supporting means for the instrument movement and dial.

As mentioned before the studs 46 extend beyond the rear side of the instrument case. On the outside of the case they receive the clamping nuts 66 which, when drawn up, will pull the closure member 12 against the rim at the open side of the case and thus provide for a rigid assembly.

There are also provided the auxiliary nuts 68 which serve to lock the nuts 66 in place and also act as clamping nuts to retain the electric terminal 70 in place through which current is supplied to the meter.

For effecting a seal around the open side of the case the closure member 12 has a shouldered groove 72 extending therearound and within which there is a resilient gasket 74 that bears against the rim of the case. When the nuts 66 are tightened the gasket 74 is compressed into sealing engagement between the cover member and casing rim and thereby prevents moisture and dirt particles from gaining access to the instrument movement.

To make the assembly solid and rigid the shoulder 76 adjacent the gasket 74 abuts the rim of the case when the gasket has been compressed a predetermined amount. In order to effect a seal around the studs at the points where they pass through the bottom wall of the case, there may be provided the resilient gasket means 78 suitably mounted in recesses which are coaxial with the apertures through which the studs 46 extend.

As will be noted in Figure 2, the studs 46 extend through the instrument assembly in a plane substantially to one side of the center thereof. While in certain assemblies it would be possible to arrange the studs co-planar with the center line of the instrument assembly, in the arrangement shown the positive cocking effect which might be produced by the off center stud arrangement is offset by the projection 80 which extends inwardly from the closure member 12 on the side of the center line opposite the stud 46 and which engages the bottom wall of the case as by the stud and nut arrangement at 82.

This auxiliary securing device provides for an even distribution of clamping force around the periphery of the cover member 12.

In some instances it is desired to employ a metallic instrument case either for the purpose of strength or to shield the instrument movement from stray magnetic fields.

This invention is adaptable to a metallic case instrument as illustrated in Figure 6 wherein the arrangement shown is substantially identical with that shown in Figures 1 through 5 except that the instrument case is formed of metal and the anchor for the studs is formed by a block of insulating material 84 which is affixed to the shroud of the instrument cover member by any suitable means such as by cementing, by screws, by rivets, or any other suitable devices.

In the arrangement shown in Figure 6 the studs are still useful as electrical lead-ins to the instrument movement. It will be understood, however, that if auxiliary lead-ins were to be provided the studs could thread directly into the metallic cover plate or into any suitable non-insulating receiving block mounted on the said cover plate.

While the arrangement shown in Figure 4 utilizes a clamping nut at 60 for clamping the instrument movement on to the studs prior to the assembly of the movement and the cover plate on the instrument case proper, the arrangement illustrated in Figure 7 eliminates the said clamping nut. This is done by forming the instrument case to such a depth that the movement is tightly clamped between the bottom wall thereof and the cover member at the time the instrument is assembled.

The parts in Figure 7 which are similar to those in Figure 4 carry corresponding numbers with the addition of a subscript a and it will be observed that the resilient gasket means 78a is so arranged that it bears directly on the electric terminal 58a so that the said terminal is held tightly against the metallic washer 56a therebeneath. In turn, the washer 56a bears against the insulating washer 54a which urges the magnetic frame, dial, and insulating means at the right side thereof tightly against the boss 48a.

In the arrangement shown in Figure 7 the resilient gasket means 78a around the studs 46a, not only holds the end of lead 58a in electrical contact with washer 56a but also provides an automatic compensation for slight variations in the size of the several parts of the instrument so that a tight and rigid assembly is obtainable at all times. In this figure, as in Figures 1-5, the instrument case and windowed cover member therefor, are of electrical insulating material.

It will be apparent from the foregoing that this invention provides for a relatively simple and inexpensive manner of assembling an electrical indicating instrument and utilizes the fewest number of parts by combining several functions in the studs 46.

Due to the fact that the instrument dial is mounted on the shoulder bushing 52 which telescopes with the bores in the magnetic frame through which the studs 46 pass, the instrument dial is at all times properly aligned with the instrument movement. Thus, no accuracy of indication of the instrument is lost by utilizing the teachings of this invention.

It will be understood that this invention is susceptible to modification in order to adapt it to different usages and conditions and, accordingly, it is desired to comprehend such modifications within this invention as may fall within the scope of the appended claims.

I claim:

1. In an electrical instrument, a movement including electric terminals and a pointer, a dial over which said pointer swings, a cup-shaped case for receiving said movement and a separable cover, studs mounted on said cover therefor and extending through said case for clamping said cover into position, means for mounting said movement and dial on said studs for rigid support thereby when said instrument is assembled, and means for making electrical connection between said studs and said terminals.

2. In an electrical instrument, a movement including electric terminals and a pointer, a dial over which said pointer swings, a cup-shaped case for receiving said movement and a separable cover therefor, studs mounted on said cover and extending through said case for clamping said cover into position, bores in said movement and dial for receiving said studs for clamping said movement and dial in position when said instrument is assembled, and insulator means electrically isolating said movement and dial from said studs.

3. In an electrical instrument, a movement including electric terminals and a pointer, a dial over which said pointer swings, a cup-shaped case for receiving said movement and a separable cover therefor, studs mounted on said cover and extending through said case for clamping said cover into position, bores in said movement and dial for receiving said studs for clamping said movement and dial in position when said instrument is assembled, insulator means electrically isolating said movement and dial from said studs, and means for electrically connecting said studs with said dial.

4. In an electrical instrument, a case open on one side, a flanged closure member mounted on the said one side and including a window, a pair of studs extending inwardly from said cover member and passing through the bottom of said case, a resilient annular gasket between said cover member and said case, and abutment means extending peripherally around said cover member and adapted for engagement with said case upon the compression of said gasket means by tension on said studs.

5. In an electrical instrument, a case open on one side, a flanged closure member mounted on the said one side and including a window, a pair of studs extending inwardly from said cover member and passing through the bottom of said case, a resilient annular gasket between said cover member and said case, abutment means extending peripherally around said cover member and adapted for engagement with said case upon the compression of said gasket means by tension on said studs, and a movement in said case comprising a frame and an element movable therein, said frame being bored to receive said studs for support thereby.

6. In an electrical instrument, a case open on one side, a flanged closure member mounted on the said one side and including a window, a pair of studs extending inwardly from said cover member and passing through the bottom of said case, a resilient gasket between said cover member and said case, abutment means extending peripherally around said cover member and adapted for engagement with said case upon the compression of said gasket means by tension on said studs, a movement in said case comprising a frame and an element movable therein carrying a pointer, a dial over which said pointer swings, bores through said frame and dial for loosely receiving said studs for support thereby, and insulator means between said studs and said movement and dial whereby said studs may act as lead-ins for conducting current to the terminals of said movement.

7. In a electrical instrument, a case open on one side, a flanged cover member for the open side of said case and including a window, a resilient gasket between the open side of said case and said member, a pair of studs secured to said member and extending through the bottom of said case, a movement in said case comprising a frame and an element movable therein, a dial over which a pointer secured to said movement swings, insulator means between said studs and said movement and said dial, and resilient means in the bottom wall of said case surrounding said studs and adapted to bear against the back of said movement when the instrument is assembled thereby to clamp the entire assembly tightly together.

8. In an electrical instrument, a cup-shaped case of electrical insulating material, a cover member for the open end of said case also of electrical insulating material and having a window therein, stud receiving bosses projecting inwardly from said cover, studs in said bosses extending through the bottom wall of said case and having clamping nuts thereon to clamp said cover in position, a sealing gasket between said cover and said case, and between said case and said studs, a movement in said case comprising a magnetic frame having bores therethrough for loosely receiving said studs, a dial between said movement and said window over which the pointer of the movement swings and also having bores therethrough for receiving said studs, insulating members between said dial, movement and studs, means around said studs between said movement and the bottom of the case whereby when said clamping nuts are tightened, said movement and dial are clamped between the cover and the bottom of said case, and means for making electrical connection between said studs and the terminals of said movement.

9. In an electrical instrument, a cup-shaped case having a rim around its open side, a flanged closure member for the open side of said case having a window opening therein and a shroud part closing off part of said opening, a shouldered groove around said member and a resilient gasket therein for engagement with the rim of said case, a shoulder on said groove positively engaging said rim when said gasket is compressed a predetermined amount, bosses upstanding from the inner side of said shroud part, and studs secured to said bosses and extending through the bottom of said case to receive clamping nuts for retaining said cover in sealing engagement with said case, said studs also serving to support and align a movement in said case.

WILLIAM R. TRIPLETT.

REFERENCES CITED

The following references are of record in the file of this patent:

UNITED STATES PATENTS

| Number | Name | Date |
| --- | --- | --- |
| 985,457 | Rypinski | Feb. 28, 1911 |
| 1,355,515 | Smith | Oct. 12, 1920 |
| 1,486,238 | France | Mar. 11, 1924 |
| 1,624,417 | MacGahan | Apr. 12, 1927 |
| 1,684,149 | Rutter | Sept. 11, 1928 |
| 2,229,399 | Truax | Jan. 21, 1941 |
| 2,367,449 | Triplett | Jan. 16, 1945 |
| 2,426,800 | Triplett | Sept. 2, 1947 |